United States Patent

Hashizume et al.

(10) Patent No.: US 8,598,723 B2
(45) Date of Patent: Dec. 3, 2013

(54) HYBRID ENGINE-DRIVEN POWER GENERATOR

(75) Inventors: Takashi Hashizume, Saitama (JP); Masanori Ueno, Saitama (JP); Makoto Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 13/096,693

(22) Filed: Apr. 28, 2011

(65) Prior Publication Data

US 2011/0304139 A1    Dec. 15, 2011

(30) Foreign Application Priority Data

Jun. 15, 2010 (JP) .................... 2010-136031

(51) Int. Cl.
*H02P 9/00* (2006.01)
(52) U.S. Cl.
USPC .............................. 290/40 C; 307/64; 322/10
(58) Field of Classification Search
USPC .......................................... 290/40 A; 307/64
See application file for complete search history.

(56) References Cited

U.S. PATENT DOCUMENTS

| | | | | |
|---|---|---|---|---|
| 4,405,867 A | * | 9/1983 | Moakler et al. | 307/64 |
| 6,175,217 B1 | * | 1/2001 | Da Ponte et al. | 322/19 |
| 6,278,622 B1 | * | 8/2001 | Shimazaki et al. | 363/37 |
| 6,624,533 B1 | * | 9/2003 | Swanson et al. | 307/64 |
| 6,819,007 B2 | * | 11/2004 | Fukaya | 290/40 C |
| 6,943,531 B2 | * | 9/2005 | Fukaya | 322/10 |
| 2003/0015875 A1 | | 1/2003 | Fukaya | |
| 2003/0094816 A1 | | 5/2003 | Kazama | |
| 2003/0209909 A1 | * | 11/2003 | Fukaya et al. | 290/40 A |
| 2004/0008009 A1 | | 1/2004 | Fukaya | |
| 2008/0116695 A1 | | 5/2008 | Peterson | |

FOREIGN PATENT DOCUMENTS

| | | |
|---|---|---|
| EP | 1 738 947 A2 | 1/2007 |
| JP | 2003284258 A * | 10/2003 |
| JP | 3941927 B2 | 7/2007 |
| JP | 4082657 B2 | 4/2008 |

* cited by examiner

*Primary Examiner* — Joseph Waks
(74) *Attorney, Agent, or Firm* — Arent Fox LLP (57) ABSTRACT

A power generator starts an engine by overcoming an inrush current occurs. A calculator (21) retrieves an outputtable current of a generator according to an engine speed. A calculator (23) calculates the lacking amount of the outputtable current relative to a load current. When the remaining battery level is sufficient, a DC/DC converter controller (24) supplies a current corresponding to the lacking amount from the battery (4) to a DC part (52). If the battery (4) starts supplying a power, FETs (Qa to Qf) of a rectifying part (51) are powered off and an output of the power generator (3) is stopped. When an engine frequency stability deciding part (27) decides the engine frequency is stable the rectifying part (51) restarts the output of the generator (3) and the current supply from the battery (4) to the DC part (52) is stopped.

5 Claims, 7 Drawing Sheets

HYBRID ENGINE-DRIVEN POWER GENERATOR

TECHNICAL FIELD

The present invention relates to a hybrid engine-driven power generator, and particularly to a hybrid engine-driven power generator suitable for preventing a drooping time of an engine frequency and a reduction time of a generator output voltage from elongating during load inrush (including a change period from a low load to a high load), enhancing a starting performance, and restricting a reduction of the generator output.

BACKGROUND ART

Conventionally, there is known a hybrid engine-driven power generator including a rectifier for converting an AC 3-phase output voltage from an alternator driven by an engine into a DC voltage, an inverter for converting the DC output of the rectifier into an AC output voltage, a filter circuit, a battery, a DC/DC converter for boosting a DC voltage of the battery and supplying the same between the rectifier and the inverter, and a control part for controlling the outputs of the inverter and the DC/DC converter. The hybrid engine-driven power generator of this type is described in Japanese Patent Publication No. 3941927, for example. Japanese Patent Publication No. 4082657 describes therein, for example, a structure of the hybrid engine-driven power generator in which the DC voltage of the battery is boosted and supplied to the DC/DC converter during an overload while when an external load current is larger than a rated current value, the voltage of the inverter is changed according to a preset map.

CITATION LIST

Patent Literature

Patent Literature 1 "Japanese Patent Publication No. 3941927"
Patent Literature 2 "Japanese Patent Publication No. 4082657"

SUMMARY OF INVENTION

Technical Problem

According to the conventional hybrid engine-driven power generator described in Japanese Patent Publication No. 4082657, a load can be started without stalling the engine even when an inrush current occurs during an increased load. In the conventional technique, however, since when an inrush current occurs, an amplitude of an output sinusoidal wave is temporarily reduced and thus an input voltage of the inverter is reduced, a load start time can be elongated or a load cannot be started (can be reset) due to the reduction in voltage, which are the problems to solve.

It is an object of the present invention to provide a hybrid engine-driven power generator capable of, when an inrush current occurs, starting a load without stalling an engine.

Solution to Problem

A first feature of the present invention is A hybrid engine-driven power generator which comprises a power generator driven by an engine and a battery for power generator main bodies, and has a rectifier for rectifying an output of the power generator, an inverter for converting an output of the rectifier into an AC output to be a generator output, and a DC/DC converter for boosting a DC voltage of the battery and inputting the boosted voltage into the inverter, comprising: an engine revolution frequency detecting means; a means for calculating an outputtable current of the power generator corresponding to an engine revolution frequency; a load current detecting means; a means for calculating the lacking amount of the outputtable current of the power generator corresponding to the load current; and a controlling means for controlling the DC/DC converter in order to supply a current corresponding to the lacking amount of the current value from the battery to the inverter.

A second feature of the present invention is the hybrid engine-driven power generator comprising: a means for detecting a terminal voltage of the battery; and a means for deciding whether the terminal voltage of the battery is a reference voltage or more for deciding the remaining amount of the battery, wherein when the terminal voltage of the battery is the reference voltage or more, the controlling means supplies a current corresponding to the shortage of the current value to the inverter.

A third feature of the present invention is the hybrid engine-driven power generator wherein the output from the power generator is temporarily stopped in response to a current supply start from the battery to the inverter, and the controlling means controls the DC/DC converter such that all the load currents are provided by the output from the battery.

A fourth feature of the present invention is to hybrid engine-driven power generator comprising: an engine revolution frequency deciding means for deciding whether the engine revolution frequency is stable within a preset range of a target engine revolution frequency decided depending on the load current, wherein when it is decided that the engine revolution frequency is in the stable state, the output from the power generator is started and the output from the battery is reduced.

A fifth feature of the present invention is the hybrid engine-driven power generator wherein the shortage of the current value due to the battery output is compensated according to preset output ratios of the power generator and the battery.

Advantageous Effects of Invention

According to the present invention having the above features, even when an inrush current occurs during a change from a low load to a high load, the lacking load current due to the generator output can be compensated by an output of the battery and thus the engine load can be avoided from increasing too much and the engine can be prevented from being stalled.

According to the present invention having the second feature, since the battery output assists the generator output when the remaining amount of the battery is sufficient, an overdischarge of the battery can be prevented.

According to the present invention having the third feature, since the generator output is temporarily stopped when the battery starts outputting, a reduction in engine frequency due to an increased load on the engine can be prevented, thereby starting the engine in a short time up to the frequency depending on the load while the battery output is meeting the load, and enhancing the load starting characteristics.

According to the present invention having the fourth feature, since the state in which the engine frequency is stabilized is accurately confirmed and then the generator can start outputting, thereby reducing the output from the battery, the generator output voltage of the hybrid engine-driven power generator can be prevented from reducing when a load is switched or a load is powered on.

According to the present invention having the fifth feature, the battery output can assist the generator output in a predetermined range, thereby alleviating the load of the battery.

DESCRIPTION OF EMBODIMENTS

Figure 1:
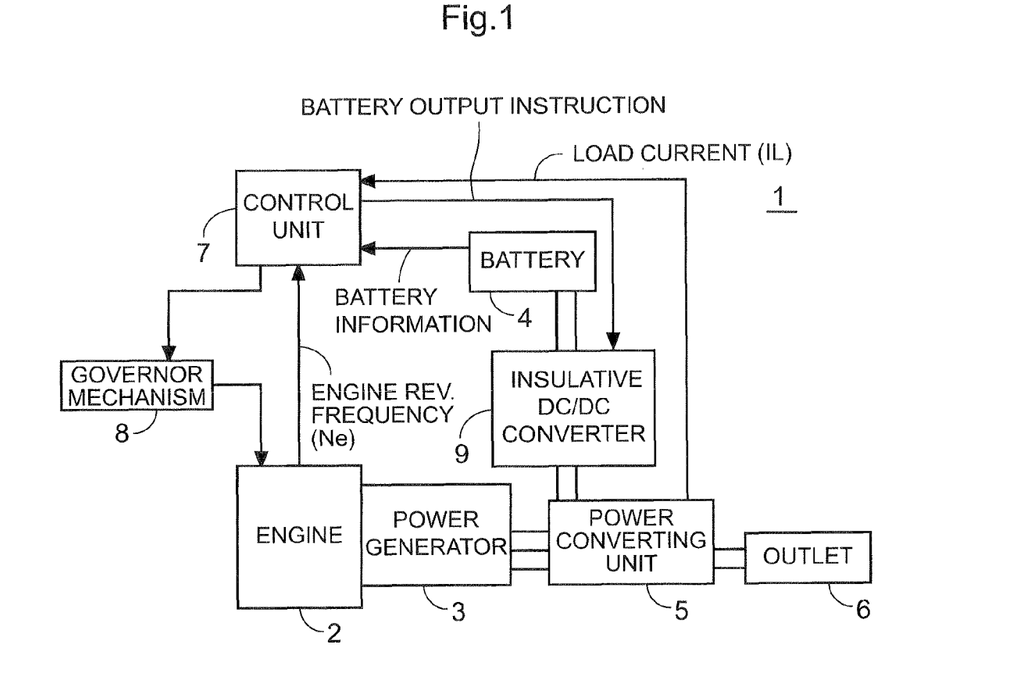
FIG. 1 is a block diagram showing a system structure of a hybrid engine-driven power generator according to one embodiment of the present invention.

One embodiment of the present invention will be described below with reference to the drawings. FIG. 1 is a system structure diagram of a hybrid engine-driven power generator according to one embodiment of the present invention. In FIG. 1, the hybrid engine-driven power generator 1 has a power generator 3 connected to an engine 2 and driven by the engine 2. The power generator 3 is a 3-phase multipolar magnet power generator, for example. An output side of the power generator 3 is connected to a power converting part 5. The power converting part 5 rectifies, reduces and converts a generator output of the power generator 3 into an AC output having a predetermined frequency, and further performs a filter processing on the generator output to be connected to an outlet 6 as an output terminal.

A battery 4 is connected to the power converting part 5 via an insulative DC/DC converter 9, and a current by the generator output of the power generator 3 and a current by a power of the battery 4 are summed up to be supplied to the outlet 6.

When being input a detection value of a load current IL detected at an output side of the power converting part 5 (hereinafter simply referred to as "load current"), a control unit (control part) 7 calculates a target engine frequency depending on the load current IL. For example, the target engine frequency associated with the load current IL is previously stored as a map in a memory, and the map is retrieved to find the target engine frequency. The control part 7 controls a governor mechanism 8 and adjusts a throttle aperture of the engine 2 such that an engine frequency Ne detected by a frequency sensor (a well-known sensor is available) of the engine 2 converges on the target engine frequency.

The control part 7 can supply a battery output instruction to the DC/DC converter 9, and the DC/DC converter 9 controls an input from the battery 4 according to the battery output instruction and supplies a power saved in the battery 4 to the power converting part 5. Battery information (such as battery voltage) is considered for the battery output instruction.

Figure 2:
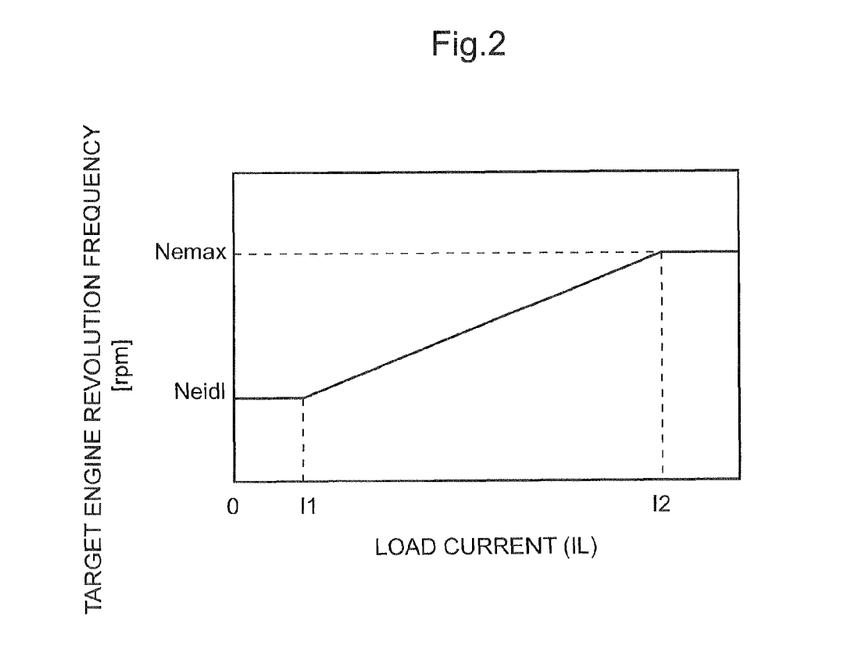
FIG. 2 shows an example of a map in which a target engine frequency is set for a load current.

FIG. 2 is a diagram showing one example of the map in which the target engine frequency is set in relation with the load current IL. The target engine frequency is set at an idle frequency Neidl (such as 2500 rpm) while the load current IL is between zero and I1, the target engine frequency increases along with an increase in load current IL, and the target engine frequency is set at the maximum value Nemax when the load current IL reaches I2.

Figure 3:
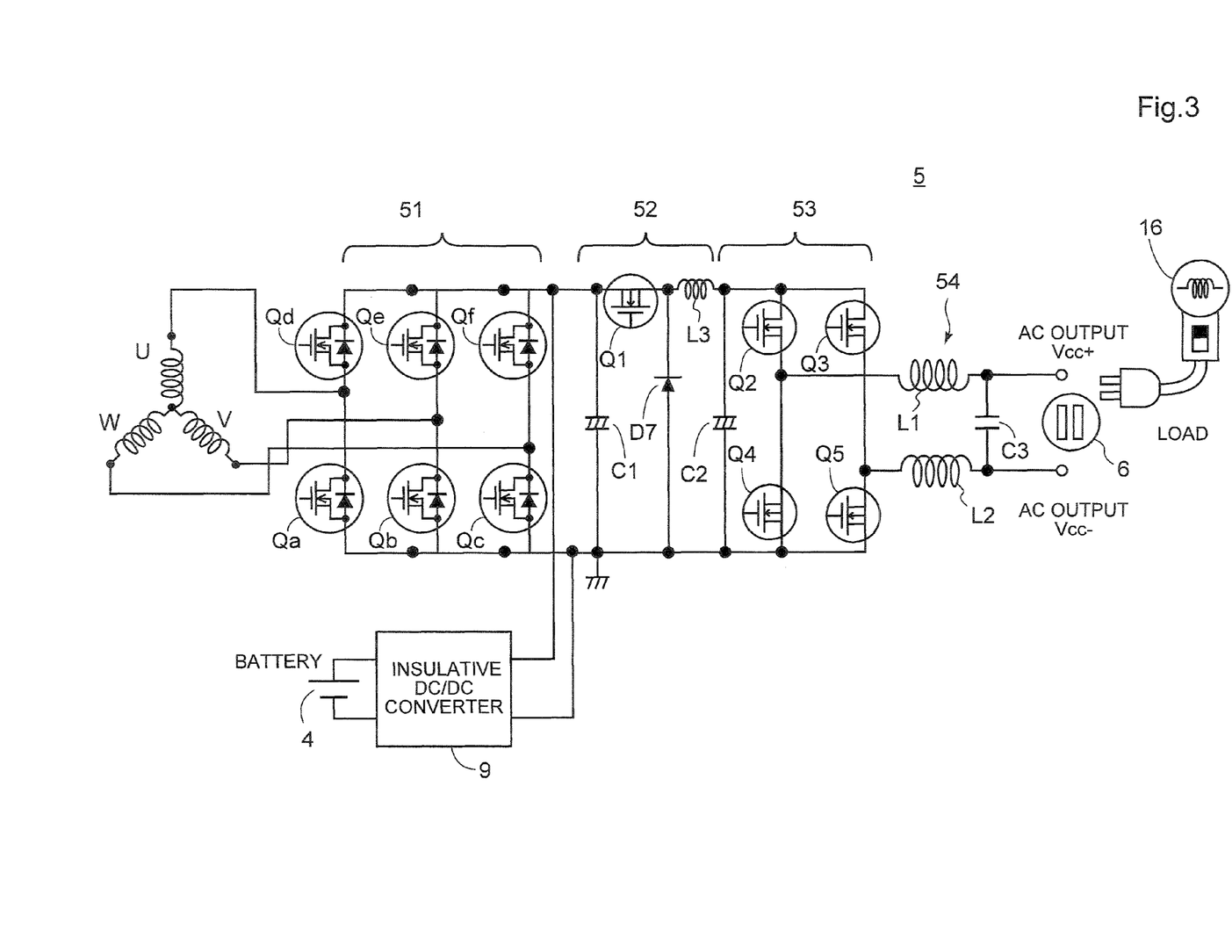
FIG. 3 is a circuit diagram showing a more specific structure of the hybrid engine-driven power generator.

FIG. 3 is a circuit diagram showing a specific structure of the hybrid engine-driven power generator. The power converting part 5 is formed of a rectifying part 51, an DC part 52, an inverter 53 and a waveform shaping circuit 54.

The rectifying part 51 is a bridge rectifying circuit having bridge-connected FETs Qa, Qb, Qc, Qd, Qe and Qf. A 3-phase winding 3U, a 3-phase winding 3V and a 3-phase winding 3W of an alternator 3 are connected to a coupling point between the FET Q1 and the FET Qd, a coupling point between the FET Qb and the FET Qe and a coupling point between the FET Qc and the FET Q8f respectively.

The DC part 52 is a voltage converting circuit (voltage reducing DC/DC converter), and includes the switching device (FET) Q1 and a choke coil L3 which are connected to an output line of the rectifying part 51 in series, and a diode D7 connected to the output line of the rectifying part 51 in parallel. Capacitors C1, C2 are connected to an input side and an output side of the AC part 52 in parallel, respectively.

The inverter part 53 is formed by bridge-connecting four FETs Q2, Q3, Q4 and Q5. The waveform shaping circuit 54 is formed of coils L1, L2 and a capacitor C3.

The FET Q1 of the DC part 52, the FETs Q2 to Q5 of the inverter part 53 and the FETs Qa to Qf of the rectifying part 51 are PWM-controlled by the control part 7. The DC part 52 reduces an input DC voltage. The inverter part 53 converts an input voltage into an AC voltage having a predetermined frequency and inputs the AC voltage into the waveform shaping circuit 54. An output side of the waveform shaping circuit 54 is connected to the outlet 6 for extracting a generator output to the outside. A load 16 is connected to the outlet 6.

The battery 4 is connected to an input side of the insulative DC/DC converter 9, and an output side of the insulative DC/DC converter 9 is connected to the input side of the AC part 52. An output power of the battery 4 is boosted in the insulative DC/DC converter 9 and is input into the AC part 52.

Figure 4:
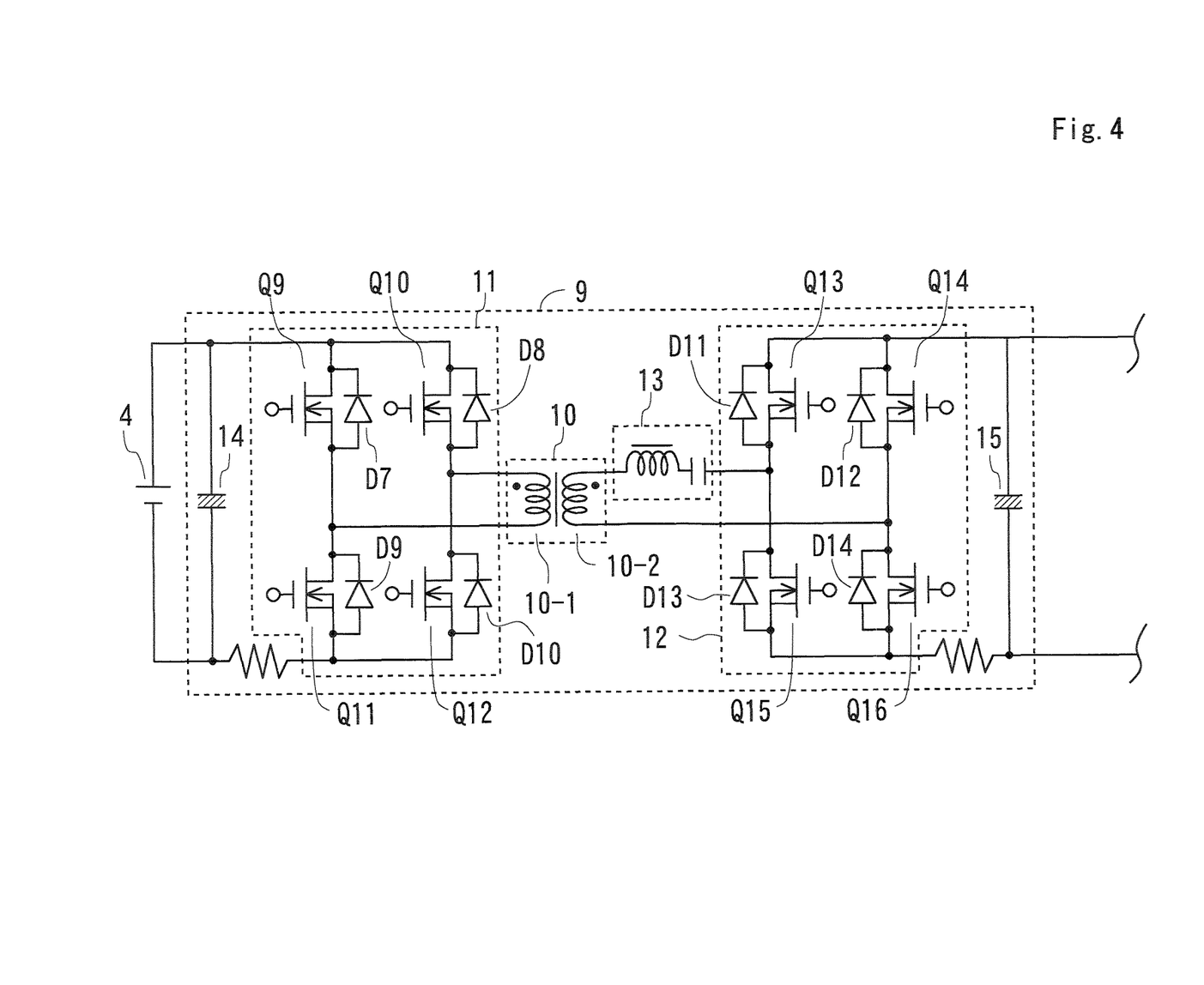
FIG. 4 is a circuit diagram showing one example of a DC/DC converter.

FIG. 4 is a circuit diagram showing a structure example of the insulative DC/DC converter 9. The insulative DC/DC converter 9 includes a transformer 10 including a low voltage side winding 10-1 at the primary side and a high voltage side winding 10-2 at the secondary side. A boosted voltage ratio of the insulative DC/DC converter 9 is determined by a winding ratio of the low voltage side winding 10-1 relative to the high voltage side winding 10-2.

A low voltage side switching part 11 is connected to the low voltage side winding 10-1 and a high voltage side switching part 12 is connected to the high voltage side winding 10-2. The low voltage side switching part 11 is configured, for example, by bridge-connecting four FETs Q9, Q10, Q11 and Q12, and the high voltage side switching part 12 is also formed by bridge-connecting four FETs Q13, Q14, Q15 and Q16 similarly.

The FETs Q9 to Q16 of the low voltage side switching part 11 and the high voltage side switching part 12 are connected with diodes D7, D8, D9, D10 and D11, D12, D13, D14 in parallel, respectively. These diodes may be parasitic diodes of the FETs or additionally-connected diodes. The low voltage side switching part 11 and the high voltage side switching part 12 may be assumed as a switching/rectifying part in a combination of the rectifying devices D7 to D14 connected in parallel.

A LC resonance circuit 13 is inserted into the high voltage side winding 10-2 of the transformer 10. The LC resonance circuit 13 functions to make a current flowing when at least one of the low voltage side switching part 11 and the high voltage side switching part 12 is driven into a sinusoidal wave form, to reduce a switching loss, and not to cause FET breakdown due to a large current. This is because the FETs can be powered on or off near the zero cross point of the current in a sinusoidal wave form. The LC resonance circuit 13 may be provided at the primary side not at the secondary side.

The FETs Q9 to Q12 of the low voltage side switching part 11 and the FETs Q13 to Q16 of the high voltage side switching part 12 are controlled for their switching by the control part 7. Capacitors 14, 15 connected to the primary side and the secondary side are output smoothing capacitors.

The low voltage side switching part 11 and the high voltage side switching part 12 are driven by the same signal to be completely synchronized with each other such that the insulative DC/DC converter 9 automatically performs power conversion bidirectionally. Such driving is performed by alternately powering on and off a pair of FETs Q9 and Q12 and a pair of FETs Q10 and Q11 in the low voltage side switching part 11 and alternately powering on and off a pair of FETs Q13 and Q16 and a pair of FETs Q14 and Q15 in the high voltage side switching part 12, as well known.

Power conversion is performed from the primary side of the insulative DC/DC converter 9 to the secondary side during an engine start, and then the thus boosted DC voltage of the battery 4 is given to the rectifying part 51 that functions as a drive inverter. The rectifying part 51 PWM-drives the Qa to Qf as well known, and converts an input DC voltage into a 3-phase AC voltage to be applied to the alternator 3. Thus, the engine 2 is started. In time of the engine start, a phase can be decided by utilizing a change in current distribution by back electromotive voltage occurring according to the operation of the alternator 3, and can be synchronously driven under sensorless control.

While the FET Q1 is being powered on, charges (energy) are accumulated in the choke coil L3 and the capacitor C2 by the voltage input from the rectifying part 51 or the insulative DC/DC converter 9. Then, when the FET Q1 is powered off, a current flows through the diode D7 and the coke coil L3 by the accumulated energy. An output voltage of the AC part 52 is reduced depending on a duty ratio of the FET Q1.

Figure 5:
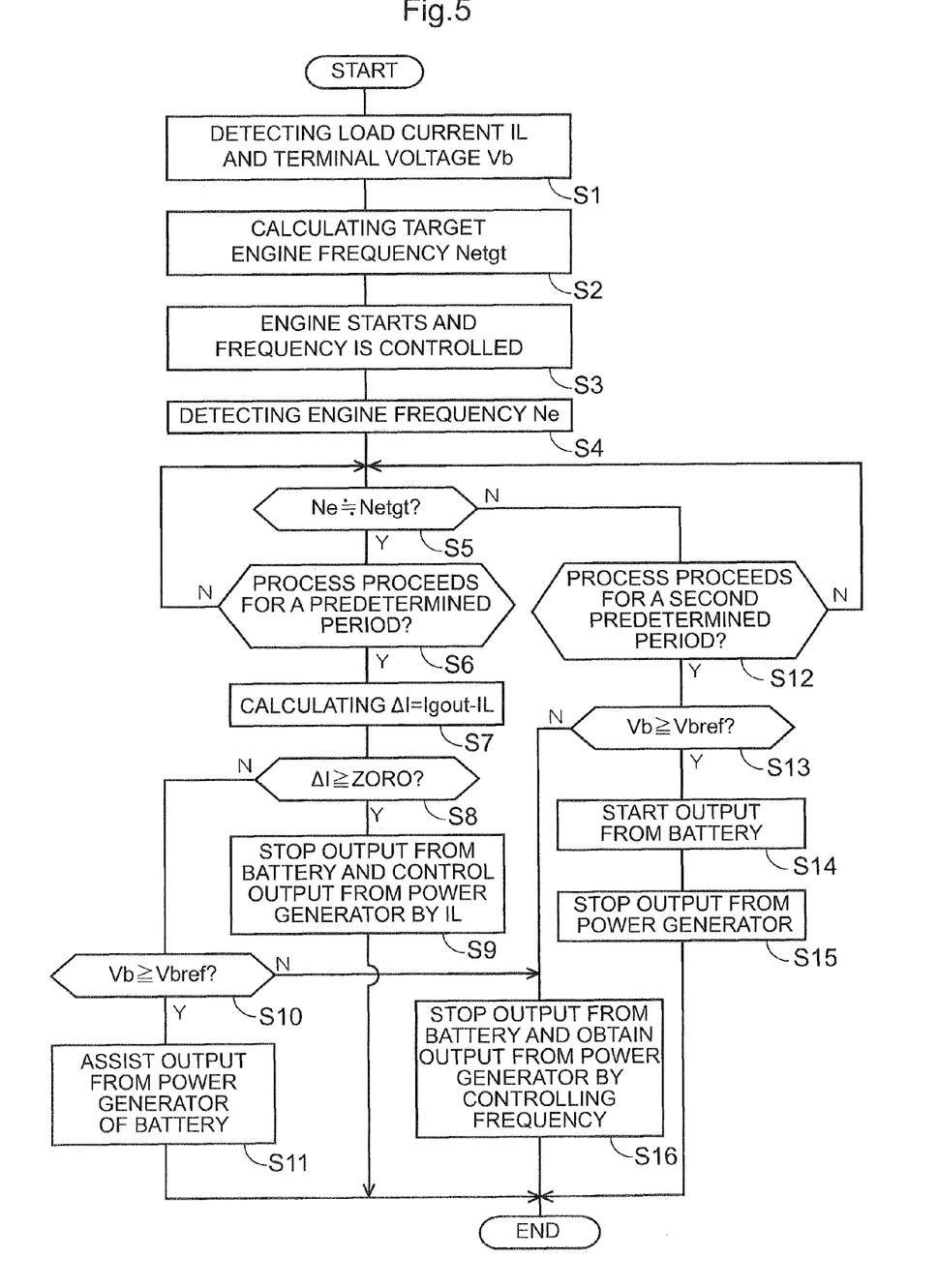
FIG. 5 is a flowchart of control operations of the hybrid engine-driven power generator.

FIG. 5 is a flowchart showing the operations of the control unit according to a first example of the present embodiment. The processings of the flowchart are performed on interruption for each 10 milliseconds, for example. In FIG. 5, in step S1, the load current IL and a terminal voltage Vb of the battery 4 are detected. The load current IL is calculated based on voltages detected at both ends of voltage detection resistors capable of being provided between the inverter part 53 and the waveform shaping circuit 54. In step S2, a load current/target frequency map (see FIG. 2) is retrieved based on the load current IL to calculate a target engine frequency Netgt. The target engine frequency Netgt may be calculated by a preset operational formula. In step S3, the engine 2 is started, and the throttle aperture is controlled by the governor mechanism 8 such that the engine frequency Ne converges on the target engine frequency Netgt.

In step S4, the engine frequency Ne is detected by a frequency sensor (not shown). In step S5, a decision is made as to whether the engine frequency Ne substantially converges on the target engine frequency Netgt (for example, whether the engine frequency Ne is within ±100 rpm of the target engine frequency Netgt), that is, whether the engine frequency Ne is stable. If affirmation is taken in step S5, the processing proceeds to step S6, where a decision is made as to whether the engine frequency Ne has been stabilized for a predetermined period of time (such as 100 milliseconds). In other words, a decision is made as to whether the engine frequency Ne has remained stable for a predetermined period of time. A timer processing for the elapsed time decision is performed in another routine (not shown). Since the target engine frequency Netgt is decided depending on the load current IL, the target engine frequency Netgt also increases or decreases while the load current IL is increasing or decreasing, and the engine frequency Ne is also stabilized when the load is constant.

Figure 6:
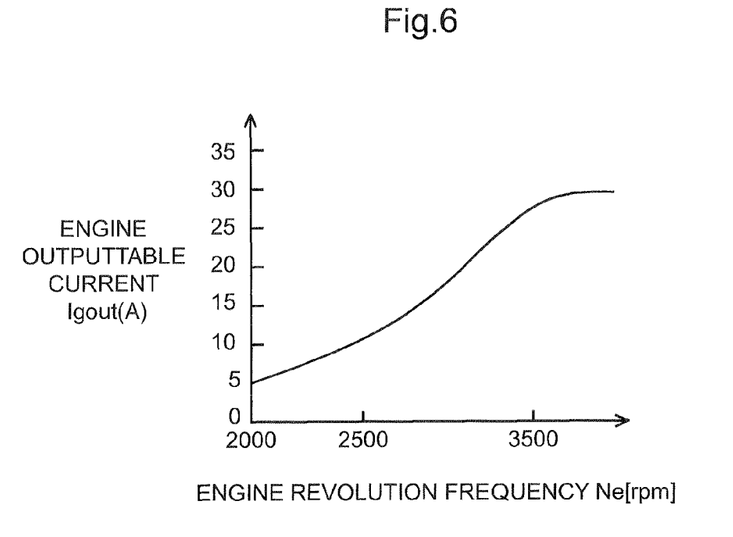
FIG. 6 shows an example of a map in which an engine outputtable current is set for the engine frequency.

If affirmation is taken in step S6, the processing proceeds to step S7, where a difference $\Delta I$ ($\Delta I$=Igout−IL) between the load current IL and the outputtable current Igout of the power generator 3 is calculated. The outputtable current Igout of the power generator 3 can be set in the map as a value for the engine frequency Ne, for example. FIG. 6 shows an example of the map in which the outputtable current Igout of the power generator 3 is set for the engine frequency Ne. The map is set such that the outputtable current Igout increases as the engine frequency Ne increases.

In step S8, a decision is made as to whether the current difference $\Delta I$ is zero or more. When the current difference $\Delta I$ is zero or more, the processing proceeds to step S9, where the DC/DC converter 9 is controlled to stop the output from the battery 4 and to supply all the load currents IL from the power generator 3. In other words, the target engine frequency Netgt of the engine 2 is decided depending on the load current IL to start the output of the power generator 3. In this case, when the output of the battery 4 is not completely stopped and the remaining amount of the battery 4 is sufficient, the output of the power generator 3 may be assisted at a preset ratio. The output of the battery 4 is not immediately made zero and the output ratio of the battery 4 may be gradually reduced depending on an increase in output of the power generator 3.

On the other hand, if the current difference $\Delta I$ is less than zero, that is, the outputtable current Igout of the power generator 3 is lower than the load current IL, the processing proceeds to step S10, where a decision is made as to whether a battery voltage Vb is a battery outputtable voltage Vbref or more. When the charge state of the battery 4 is sufficient, the decision in step S10 is affirmative, and when the charge state of the battery 4 is not sufficient (discharged state, for example), the decision in step S10 is negative. If the decision in step S10 is affirmative, the processing proceeds to step S11.

In step S11, the DC/DC converter 9 is driven to supply a current Ib from the battery 4 to the AC part 52 in order to compensate for the lacking output current Igout of the power generator 3. The output of the DC/DC converter 9 is controlled such that as a negative magnitude of the current difference $\Delta I$ is larger, the output assist amount by the battery 4 is larger. Thus, as the negative value of $\Delta I$ is larger, the assist amount of the output current from the battery 4 is larger and a ratio of the output current Ib of the battery 4 relative to a total value of the output current Ib of the battery 4 and the output current Igout of the power generator 3 increases.

On the other hand, if the decision in step S5 is negative, the processing proceeds to step S12, where a decision is made as to whether a second predetermined time has elapsed. When the engine frequency Ne is not stabilized until the second predetermined time elapses, it is decided that the increase amount of the load is large and the engine frequency Ne decreases, which cannot be compensated by the output of the power generator 3. The second predetermined time is a time from the start of the engine 2 in step S3.

If affirmation is taken in step S12, the processing proceeds to step S13, where a decision is made as to whether the battery voltage Vb is the battery outputtable voltage Vbref or more. If affirmation is taken in step S13, the processing proceeds to step S14, where the battery 14 starts outputting. The output of the battery 4 is a value decided depending on the load current IL. In step S15, the FETs Q6 to Q8 of the rectifying part 51 are powered off and the output of the power generator 3 is stopped. However, the engine 2 is not stopped.

When the voltage vb of the battery 4 is less than the battery outputtable voltage in step S10 and step S13, the output from the battery 4 is not possible and the processing proceeds to step S16, where the output of the battery 4 is stopped and a current is supplied to the load by a method for controlling the output of the power generator 3 by its amplitude. When the remaining amount of the battery 4 decreases, only the amplitude control can be performed like the conventional technique.

Figure 7:
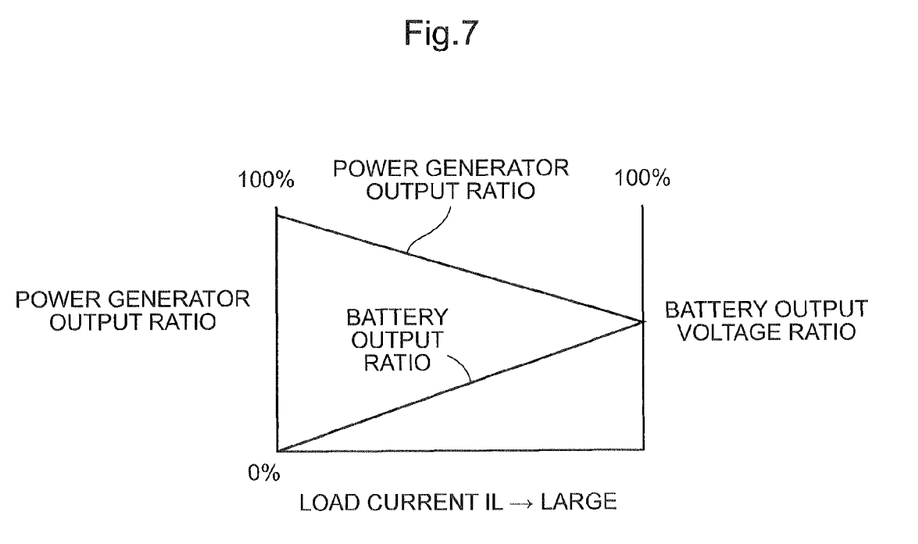
FIG. 7 is a diagram showing an output ratio relationship between a generator output and a battery output for a load current.

FIG. 7 is a diagram showing an output ratio between the power generator 3 and the battery 4 relative to the load current IL. Through the processings shown in FIG. 5, the ratio of the output of the battery 4 (battery output voltage) relative to the generator output (generator output voltage) increases depending on the load current IL. In other words, while the load current IL is small, the ratio of the generator output voltage is large and the ratio of the battery output voltage is small. When the load current IL is the maximum, the outputs of the battery 4 and the power generator 3 are the maximum values and the ratios of the outputs of the battery 4 and the power generator 3 are decided at a ratio depending on the magnitudes of the respective maximum output voltages (rated voltages). The output ratios shown in FIG. 7 are obtained when the remaining amount of the battery 4 is sufficient, and when the remaining amount of the battery 4 is insufficient, the output from the battery 4 is stopped as described above.

Figure 8:
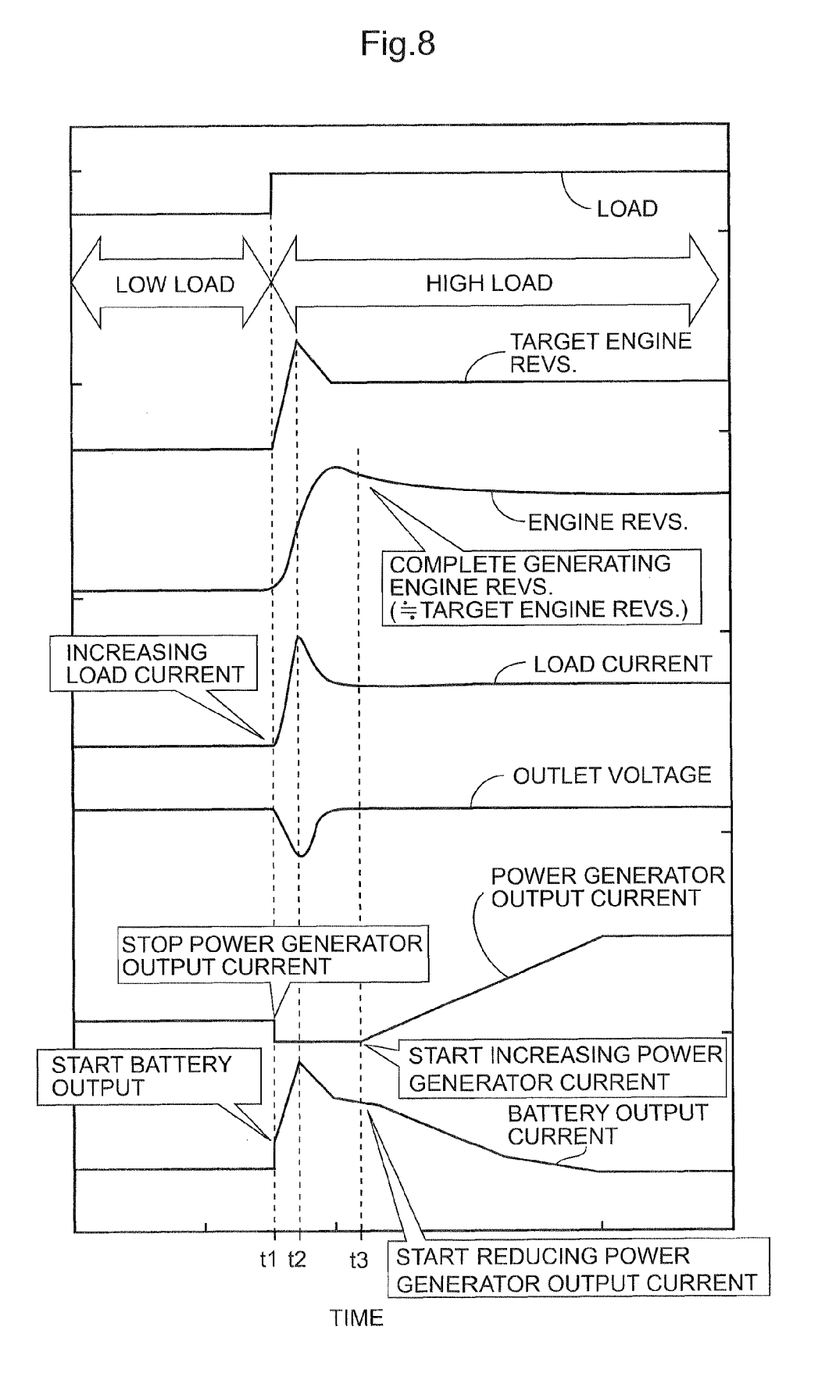
FIG. 8 is a timing chart of operations of the hybrid engine-driven power generator.

FIG. 8 is a timing chart of the operations of the hybrid engine-driven power generator according to the present embodiment. In FIG. 8, when the load is switched from a low load to a high load at timing t1, the load current IL increases. The target engine revolution frequency Netgt increases as the load current IL increases. When the load is switched, the load current IL enters a large inrush current and the target engine revolution frequency Netgt reaches a peak at timing t2. The voltage of the outlet 6 temporarily decreases due to the inrush current. The engine revolution frequency Ne gradually increases along with the target engine revolution frequency Netgt which is set to increase along with an increase in the load current IL.

Since the output of the power generator 3 cannot follow a rapid increase in the load current IL at timing t1, the output of the power generator 3 is stopped. Thus, the output current Igout of the power generator 3 is reduced to zero (see step S15). Since the battery 4 starts outputting instead of stopping the output of the power generator 3 (see step S14), the battery output current Ib starts increasing from timing t1 depending on the load current IL.

Since the engine revolution frequency Ne is stabilized at timing t3, the FETs Q6 to Q8 of the rectifying part 51 are powered on to start the output of the power generator 3 so that the output current of the power generator 3 is increased up to the value depending on the load current IL (see step S9). Thus, the voltage of the outlet 6 is also stabilized. The output current of the battery 4 is started to decrease at timing t3 where the engine revolution frequency is stabilized, and the output current of the battery is gradually decreased depending on the increase in possible output current Igout of the generator 3. The time from timing t1 when the low load is switched to the high load to timing t3 when the voltage of the outlet 6 is stabilized is 1, 2, or 3 seconds, for example.

In this manner, according to the present embodiment, if the output of the power generator 3 cannot follow the load when the low load is switched to the high load, the output of the power generator 3 is stopped and the battery 4 provides power to the load so that the engine revolution frequency Ne will not fall due to the inrush current. Thus, while the battery 4 is providing power to the load, the engine 2 rapidly converges on the target engine revolution frequency Netgt to be stabilized. In the conventional technique, since the engine revolution frequency Ne falls when the low load is switched to the high load, it takes a long time to converge on the target engine revolution frequency from the position where the engine revolution frequency Ne falls, and to stabilize the same, and the engine can stall at worst.

When the outputs of both the power generator 3 and the battery 4 compensate for the load current IL, if the remaining amount of the battery 4 is sufficient, the outputs of the power generator 3 and the battery 4 can be controlled such that a current is supplied according to both the output ratios preset depending on the load current IL. The output ratio depending on the load current IL may be preferably preset in the map. The map in this case can be set as shown in FIG. 7, for example.

Figure 9:
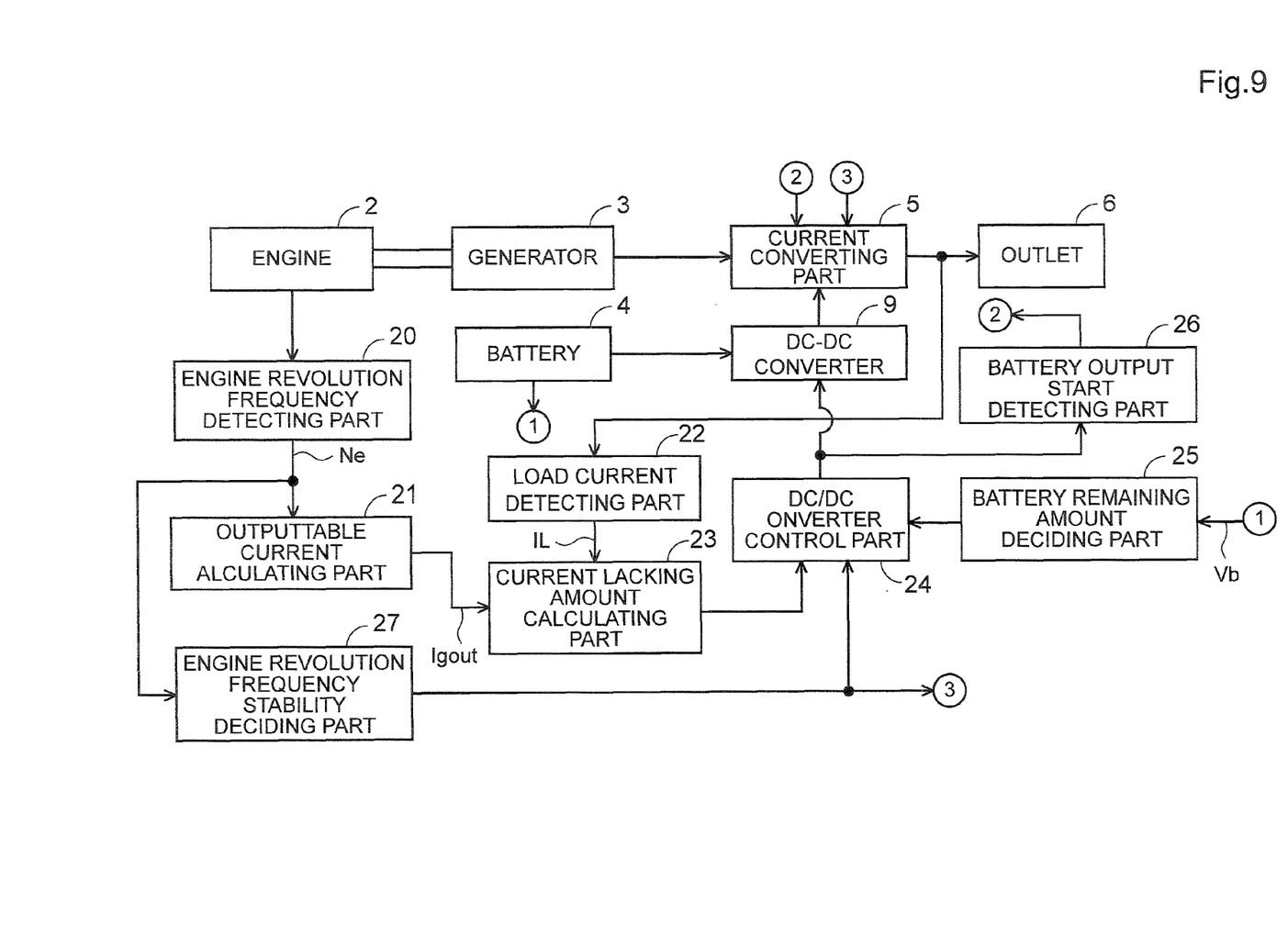
FIG. 9 is a block diagram showing essential parts' control functions of the hybrid engine-driven power generator.

FIG. 9 is a block diagram showing essential functions of the control part 7. In FIG. 9, the same reference numerals as those in FIG. 1 indicate the same or similar parts. The function of the control part 7 can be realized by a microcomputer. An engine revolution frequency detecting part 20 detects the engine revolution frequency Ne based on the output of the known engine speed sensor provided in the engine 2. The detected engine revolution frequency Ne is input into an outputtable current calculating part 21 and the outputtable current calculating part 21 calculates the outputtable current of the power generator 3 depending on the engine revolution frequency Ne. The calculation can be realized via the map retrieval of FIG. 6 by the engine revolution frequency Ne.

A load current detecting part 22 detects the load current IL flowing from the current converting part 5 (more specifically, the inverter part 54) to the outlet 6. A current lacking amount calculating part 23 subtracts the outputtable current Igout from the load current IL to calculate the current lacking amount ΔI. A DC/DC converter control part 24 drives the DC/DC converter 9 to supply a current corresponding to the current lacking amount ΔI from the battery 4 to the power converting part 5 (specifically, the DC part 52). Whether a current is supplied from the battery 4 to the power converting part 5 is decided by whether the remaining amount of the battery 4 is sufficient, and thus a battery remaining amount deciding part 25 is provided therefor.

When it is detected, based on the output of the DC/DC converter control part 24, that a current has started being supplied from the battery 4 to the current converting part 5, a battery output start detecting part 26 powers off the FETs Q6 to Q8 of the power converting part 5 (specifically, the rectifying part 51) to stop the output of the power generator 3.

An engine revolution frequency stability deciding part 27 decides whether the engine revolution frequency is stable based on whether the engine revolution frequency Ne substantially converges on the target engine revolution frequency Netgt and this state has lasted for a predetermined period of time. When it is decided that the engine revolution frequency is stable, the FETs Q6 to Q8 of the rectifying part 51 are powered on to start the output of the power generator 3. Along with this, the DC/DC converter control part 24 is driven to stop or gradually reduce the current supply from the battery 4 to the DC part 52.

The present invention has been described above with reference to the embodiment but the present invention is not limited to the embodiment and modifications may be made based on the items described in claims and the known techniques. For example, the engine starting means may not employ the power generator 3. A recoil starter or starter motor may be employed.

REFERENCE SIGNS LIST

1 . . . hybrid engine-driven power generator
2 . . . engine
3 . . . power generator
4 . . . battery
5 . . . power converting part
9 . . . insulative DC/DC converter
20 . . . engine revolution frequency detecting part
21 . . . outputtable current calculating part
22 . . . load current detecting part
23 . . . current lacking amount calculating part
24 . . . DC/DC converter control part
25 . . . battery remaining amount deciding part
27 . . . engine revolution frequency stability deciding part
51 . . . rectifying part
52 . . . DC part
53 . . . inverter part

The invention claimed is:

1. A hybrid engine-driven power generator which comprises a power generator (3) driven by an engine (2) and a battery (4) for power generator main bodies, and has a rectifier (51) for rectifying an output of the power generator (3), an inverter (53) for converting an output of the rectifier into an AC output to be a generator output, and a DC/DC converter (9) for boosting a DC voltage of the battery (4) and inputting the boosted voltage into the inverter (53), comprising:
 an engine revolution frequency detecting means (20);
 a means (21) for calculating an outputtable current of the power generator (3) based at least on an engine revolution frequency;
 a load current detecting means (22);
 a means (23) for calculating a lacking amount of the outputtable current of the power generator (3) based at least on the load current;
 a controlling means (24) for controlling the DC/DC converter in order to supply a current corresponding to the lacking amount from the battery (4) to the inverter (53); and
 a means for detecting a terminal voltage of the battery; and
 a means (25) for deciding whether the terminal voltage of the battery is a reference voltage or more for deciding the remaining amount of the battery (4),
 wherein when the terminal voltage of the battery (4) is the reference voltage or more, the controlling means (24) supplies a current corresponding to the shortage of the current value to the inverter.

2. The hybrid engine-driven power generator according to claim 1, wherein the output from the power generator (3) is temporarily stopped in response to a current supply start from the battery (4) to the inverter (53), and the controlling means (24) controls the DC/DC converter (9) such that all the load currents are provided by the output from the battery (4).

3. The hybrid engine-driven power generator according to claim 2, further comprising:
 an engine revolution frequency deciding means (27) for deciding whether the engine revolution frequency is stable within a preset range of a target engine revolution frequency decided depending on the load current,
 wherein when it is decided that the engine revolution frequency is in the stable state, the output from the power generator (3) is started and the output from the battery (4) is reduced.

4. The hybrid engine-driven power generator according to claim 1, wherein a shortage of a current value due to a battery output is compensated according to preset output ratios of the power generator (3) and the battery (4).

5. The hybrid engine-driven power generator according to claim 1, wherein the shortage of the current value due to the battery output is compensated according to preset output ratios of the power generator (3) and the battery (4).

* * * * *